US007092673B2

(12) United States Patent
Bevan et al.

(10) Patent No.: US 7,092,673 B2
(45) Date of Patent: Aug. 15, 2006

(54) ANGLE OF ARRIVAL ESTIMATION IN A WIRELESS TELECOMMUNICATIONS NETWORK

(75) Inventors: David Bevan, Bishops Stortford (GB); Victor T Ermolayev, Nizhny Novgorod (RU); Alexander G Flaksman, Nizhny Novgorod (RU); Evgeny A Mavrichev, Nizhny Novgorof (RU)

(73) Assignee: Nortel Networks Limited, St. Laurent (CA)

( * ) Notice: Subject to any disclaimer, the term of this patent is extended or adjusted under 35 U.S.C. 154(b) by 573 days.

(21) Appl. No.: 10/330,945

(22) Filed: Dec. 27, 2002

(65) Prior Publication Data

US 2004/0127230 A1     Jul. 1, 2004

(51) Int. Cl.
*H04B 1/00* (2006.01)
*H04B 7/00* (2006.01)

(52) U.S. Cl. .................. 455/69; 455/456.1; 455/456.5; 455/561; 342/350; 342/359; 342/423; 342/434; 342/445

(58) Field of Classification Search ............. 455/456.1, 455/456.5, 561, 562.1, 277.1; 342/350, 359, 342/367, 386, 443, 445, 423, 434
See application file for complete search history.

(56) References Cited

U.S. PATENT DOCUMENTS

| 5,596,333 A | 1/1997 | Bruckert | |
|---|---|---|---|
| 5,739,788 A * | 4/1998 | Dybdal et al. | 342/359 |
| 6,215,814 B1 * | 4/2001 | Ylitalo et al. | 375/148 |
| 6,597,927 B1 * | 7/2003 | Eswara et al. | 370/334 |
| 6,850,761 B1 * | 2/2005 | Pallonen | 455/437 |
| 2002/0002066 A1 | 1/2002 | Pallonen | |
| 2003/0064753 A1 * | 4/2003 | Kasapi et al. | 455/561 |
| 2005/0014533 A1 * | 1/2005 | Cave et al. | 455/562.1 |

FOREIGN PATENT DOCUMENTS

| GB | EP141886 A1 * | 5/1985 |
|---|---|---|
| GB | 2 325 785 A | 12/1998 |
| JP | 2001086050 A * | 3/2001 |

* cited by examiner

*Primary Examiner*—Edan Orgad
*Assistant Examiner*—Sujatha Sharma
(74) *Attorney, Agent, or Firm*—Barnes & Thornburg LLP

(57) ABSTRACT

The present invention relates to estimating the Angle of Arrival (AoA) of a signal from a user equipment received at a base station of a wireless telecommunications network where the base station has a multi-beam antenna. A signal received from a user equipment is received by the each of the multiple beams of the antenna, and the two adjacent beams receiving the highest amplitude from the end user are selected. A ratio of functions of the amplitudes of the two selected beams, such as a ratio of the difference between the amplitudes of the two beams to the sum of the amplitudes is calculated and compared to a data store of ratios. The data store stores expected ratios corresponding to AoAs and the calculated ratio is compared to the pre-calculated expected ratios to extract an estimate of the AoA of the signal from the user equipment.

37 Claims, 5 Drawing Sheets

ANGLE OF ARRIVAL ESTIMATION IN A WIRELESS TELECOMMUNICATIONS NETWORK

FIELD OF THE INVENTION

This invention relates to estimating the Angle of Arrival (AoA) of a signal from a user equipment received at a base station of a Wireless Telecommunications Network. In particular the present invention relates to AoA estimation for base stations of a wireless telecommunications system having beamformed or multiple beam antennas.

BACKGROUND OF THE INVENTION

A typical cell of a wireless telecommunications network has a central base station transmitting and receiving radio frequency (rf) signals over a geographical area or cell bounded by a boundary of theoretical equal signal strength with adjacent cells. The network is made up of a plurality of such cells mosaiced over a wider geographical area, as is well known in the art. The cell may be divided into sectors with typically one or more single beam antenna of the base station covering each sector.

There is currently a requirement from end users of mobile user equipments for location aware services, in which the network is aware of the location of the end user. An example might be services for advising end users of traffic jams in their location or for advising end users of local services, such as restaurants in their location.

Several schemes have so far been utilised to determine position location of a user equipment within a telecommunications network. Cell ID and enhanced cell ID provide position location by identification of the cell within which the end user equipment is located. While this system requires no modifications to the user equipment, it cannot provide precise location positioning. Another alternative, Global Positioning System (GPS) is relatively expensive, although accurate. It suffers from the disadvantage that it can take some time for a user equipment to acquire and lock on to satellites, coverage is poor indoors, power consumption by the user equipment is high and a specially modified user equipment is required. Assisted GPS enables the user equipment to acquire and lock on to a satellite more quickly but still suffers from the other disadvantages of GPS. Enhanced-Observed Time Difference (E-OTD) provides relatively accurate position location, but again requires modified user equipments. In addition network wide synchronisation or additional timing measurement devices have to be deployed in the network. Finally, Cumulative Virtual Blanking (CVB) is a complex scheme which enables the deployment of E-OTD in Code Division Multiple Access (CDMA) networks. Again modified user equipments are required.

User equipment position location can be derived by triangulation between multiple base stations. However, this requires an array of antennas in each sector of each base station in the network. Algorithms which act directly on the outputs of the antennas (or antenna columns) of such an array are expensive to implement. This is because they require either a full receiver chain at each output, or a single receiver chain plus a complex and high speed switching module to commutate this single receiver across multiple antennas.

To maximise the capacity of the base station downlink, it has been proposed to use multi-beam or beamformed antenna arrays to cover each sector of the cell of the base station, for example, three beam per sector deep cusp antennas. It is envisaged that the additional equipment complexity of the multi-beam antenna arrays and associated signal processing will be compensated for by the enhanced downlink capacity achieved. The angular position of a user equipment within a cell sector is most likely to be aligned in some way with the beam through which the received signal power is the greatest however, estimating the Angle of Arrival (AoA) of a signal on the uplink simply by picking the beam with the strongest signal would not be accurate enough for practical purposes because in the three beam per sector case, with deep cusp beams, each beam has a width between crossovers of around 40°.

SUMMARY OF THE INVENTION

The present invention relates generally to a method and system of estimating the Angle of Arrival (AoA) of a signal from a user equipment received at a base station of a wireless telecommunications network In which the base station has a multi-beam antenna. A signal received from a user equipment is received by each of the beams of the antenna, and the two adjacent beams receiving the highest amplitude signal from the end user are selected. A ratio of functions of the amplitudes (square root of measured power signal) of the two beams is calculated and the estimated AoA is derived from the ratio. A data store stores pre-calculated expected ratios corresponding to AoAs and the calculated ratio is compared to the pre-calculated expected ratios to extract an estimate of the AoA of the signal from the user equipment.

In accordance with a first aspect of the invention there is provided a method of estimating the Angle of Arrival (AoA) of a signal from a user equipment received at a base station of a wireless telecommunications network in which the base station has a multi-beam antenna, for example a three beam antenna, comprising the steps of:

deriving the amplitude of the signal for each beam of the antenna, selecting the two adjacent beams which have the highest amplitude;

calculating a ratio of functions of the amplitudes of the two selected beams;

determining the estimated AoA of the signal from the calculated ratio.

In accordance with a second aspect of the present invention there is provided a sub-system, for example a base station and/or a base station controller of a wireless telecommunications network for estimating the Angle of Arrival (AoA) of a signal from a user equipment received at a base station of the network, which base station has a multi-beam antenna, for example a three beam antenna, which sub-system comprises a signal processor for generating a signal representing the amplitude of the signal received from the user equipment for each beam of the antenna, for selecting the two adjacent beams which have the highest amplitude; for calculating a ratio of functions of the amplitudes of the two selected beams and for determining the estimated AoA of the signal from the calculated ratio.

In accordance with a third aspect of the present invention there is provided computer readable media or software suitable for installation in a sub-system, for example a base station and/or a base station controller of a wireless telecommunications network, for estimating the Angle of Arrival (AoA) of a signal from a user equipment received at the base station of the network, which base station has a multi-beam antenna, wherein the computer readable media executes the steps according to the method of the first aspect of the invention.

The AoA estimates according to the present invention are highly accurate and do not require any modification to user equipments. Where multi-beam antennas are deployed as base station antennas, the AOA estimation requires no new hardware and the AoA estimation can be achieved by the installation of appropriate computer readable media or software, which requires a low data processing overhead.

The step of calculating the ratio of functions of the amplitudes of the two selected beams may comprise the step of calculating a simple ratio of the two amplitudes or it may comprise the step of calculating a ratio of the difference between the amplitudes to the sum of the amplitudes.

The step of determining the estimated AoA of the signal from the calculated function may comprise the steps of:
inputting the calculated ratio for the two selected beams into a ratio data store, which data store stores a set of ratios for each pair of adjacent beams and stores an AOA corresponding to each such ratio, to generate an estimated AoA associated with the calculated ratio for the two selected beams.

The amplitude of the signal for each beam of the antenna may be derived as a square root of the measured power p of that beam, and the ratio $B_{xy}$ may be calculated according to the following equation:

$$B_{xy} = \frac{A_x - A_y}{A_y + A_x}$$

where $A_x$ is the amplitude of the signal for a first selected beam and $A_y$ is the amplitude of the signal for a second adjacent selected beam, and is equivalent to the following equation:

$$B_{xy} = \frac{\sqrt{p_x} - \sqrt{p_y}}{\sqrt{p_y} + \sqrt{p_x}}$$

where $p_x$ is the measured power of a selected first beam and $p_y$ is the measured power of a selected adjacent second beam.

The measured power from each beam of the antenna may be measured over a predetermined observation interval by averaging over a large number of samples. The observation interval should be chosen to be long enough, for example between 200 to 400 ms so that the effects of Doppler signal fading with a maximum Doppler frequency of 5 Hz and more do not significantly effect the measured power. That is, the observation interval should be chosen to be sufficiently long such that it encompasses a large number of independent signal fades. In this way, the measured power over the observation interval should provide a good estimate of the long term mean signal power.

For a more accurate estimation of AoA an expected noise contribution for the measured signal power may be subtracted from the measured power signal for each beam after the averaging and then the measured power may be assessed and if it is a negative value converted to a positive value before the selecting of the two adjacent beams. The expected noise contribution (which would consist of thermal noise plus residual interference) could be determined, for example, by measuring the power of the received signal samples over some sufficiently long period when the wanted signal is known to be absent.

The set of stored expected ratios $b_{x,y}$ for each adjacent beam pair (x, y), may be represented by a function $b_{x,y}(\theta)$ of the azimuth angle $\theta$ of the antenna according to the following equation:

$$b_{x,y}(\theta) = \frac{\sqrt{G_x(\theta)} - \sqrt{G_y(\theta)}}{\sqrt{G_y(\theta)} + \sqrt{G_x(\theta)}}$$

where each function $G_x(\theta)$, $G_y(\theta)$ represents a mathematical convolution of a first function representing the power beam pattern of the respective beam (x, y) as a function of the azimuth angle ($\theta$) and a second function representing the spread of signals received by the base station from a user equipment in the cell due to reflections from scatterers as a function of azimuth angle ($\theta$).

The base station will typically cover a cell of the network and the cell may be split into sectors and a multi-beam antenna may be deployed in each sector of the cell.

In accordance with a fourth aspect of the present invention there is provided a computer readable media suitable for installation in a sub-system, for example a base station and/or a base station controller, of a wireless telecommunications network, for estimating the Angle of Arrival (AoA) of a signal from a user equipment received at a base station of the network, which base station has a multi-beam antenna, for example a three-beam antenna, wherein the computer readable media includes a data store which stores a set of ratios for each pair of adjacent beams of the antenna and stores an estimated AoA corresponding to each such ratio, where each ratio represents the expected ratio of functions of the amplitudes of the pair of adjacent beams for a signal received by the antenna from a user equipment located with respect to the antenna at the estimated AoA.

According to a fifth aspect of the present invention there is provided a method for generating a ratio data store, which data store is suitable for use in estimating the Angle of Arrival (AoA) of a signal from a user equipment received at a base station of a wireless telecommunications network in which the base station has a multi-beam antenna, for example a three beam antenna, comprising the steps of:

a. generating a mathematical representation of the power beam pattern of a single beam of a multi-beam antenna to be deployed at the base station as a function of the azimuth angle ($\theta$);

b. generating a mathematical representation of the spread of signals expected to be received by the base station from a user equipment in the cell due to reflections from scatterers as a function of azimuth angle ($\theta$) of a beam of a base station antenna;

c. convolving the two mathematical representations to generate a spread angle function $G(\theta)$;

d. performing steps a. to c. for each beam of the multi-beam antenna to generate a set of spread angle functions $G_{1 \ldots n}(\theta)$, where n is the number of beams;

e. for each pair of adjacent beams generating a ratio function $b_{x,y}(\theta)$ having the form:

$$b_{x,y}(\theta) = \frac{\sqrt{G_x(\theta)} - \sqrt{Gy(\theta)}}{\sqrt{Gy(\theta)} + \sqrt{G_x(\theta)}}$$

f. generating the data store by storing values of the ratio $b_{x,y}(\theta)$ for each pair of adjacent beams and storing an azimuth angle ($\theta$) corresponding to each such value of ratio, which azimuth angle is the corresponding estimated AoA.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

In order that the present invention is more fully understood and to show how the same may be carried into effect, reference shall now be made, by way of example only, to the Figures as shown in the accompanying drawing sheets, wherein.

DETAILED DESCRIPTION OF PREFERRED EMBODIMENTS

There will now be described by way of example the best mode contemplated by the inventors for carrying out the invention. In the following description, numerous specific details are set out in order to provide a complete understanding of the present invention. It will be apparent, however, to those skilled in the art that the present invention may be put into practice with variations of the specific.

A typical cell of a wireless telecommunications network has a central base station (2) transmitting and receiving radio frequency (rf) signals over a geographical area or cell bounded by the boundary of theoretical equal signal strength with adjacent cells. The network is made up of a plurality of such cells mosaiced over a wider geographical area, as is well known in the art. The base station (2) transmits signals to end user equipments, for example mobile user equipment (6) in the cell over a downlink channel of a duplex and receives signals from the end user equipments over an uplink channel of the duplex. The base station receiver may for example have a 2 GHz carrier frequency, 3.8 Mcps chip rate and carrier spacing equal to 5 MHz.

Figure 1:
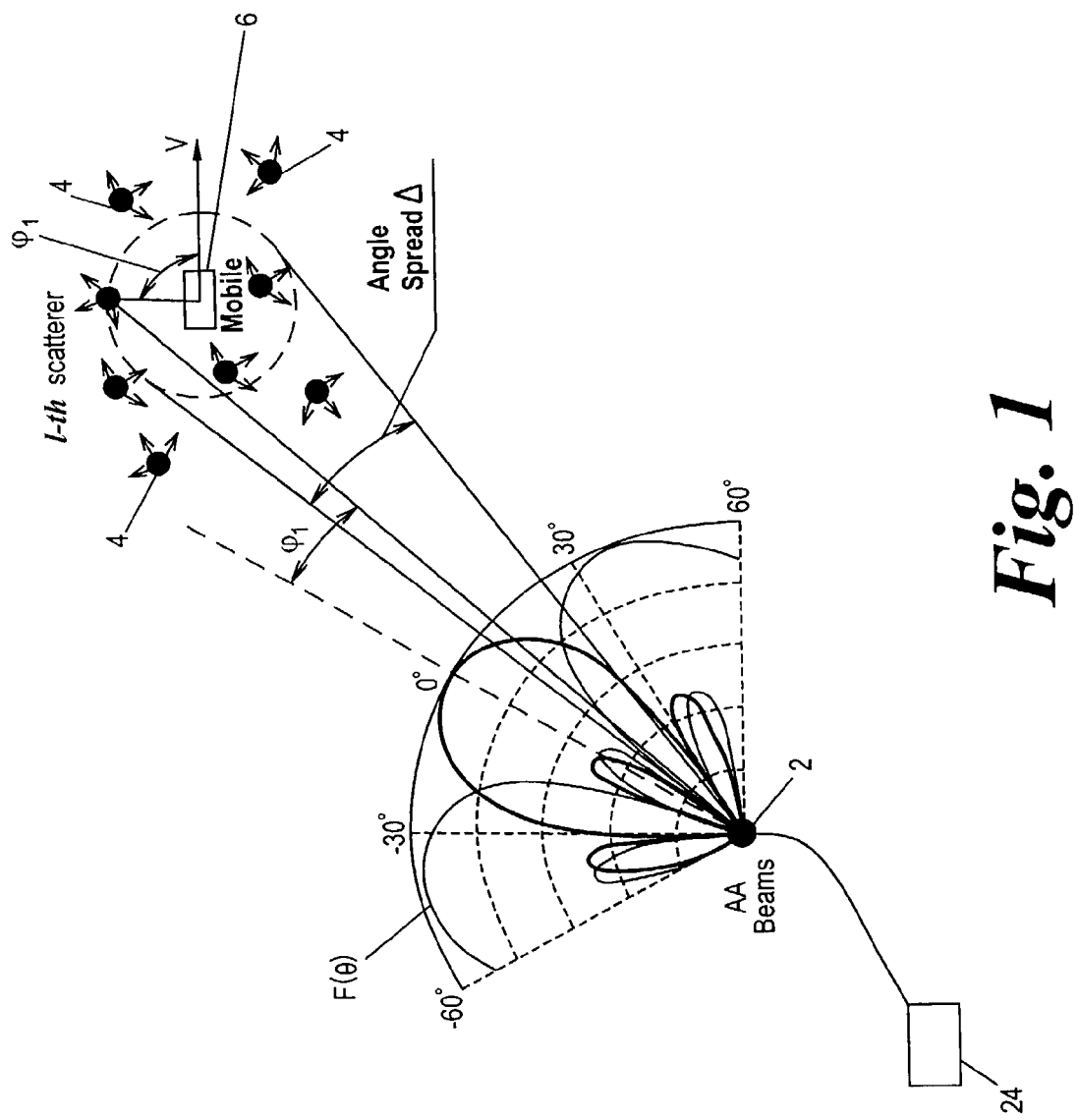
FIG. 1 shows the three antenna beams in a 120° sector of a cell covered by a base station and the parameters used in estimating a spread source angle representing the spread of the signal received by the base station from a mobile user equipment in the sector.

The base station (2) employs a multi-beam antenna in each sector of the cell, typically from two to six beams. Specifically, the base station employs a three beam deep cusp antenna array per 120° sectors generated from a facet containing 6-off $\lambda/2$-spaced columns of dual polar antenna elements, as shown in FIG. 1. The beams have a 10 dB cross-over at ±20°. This multi-beam antenna array is used principally for maximising capacity on the downlink channels.

Figure 3:
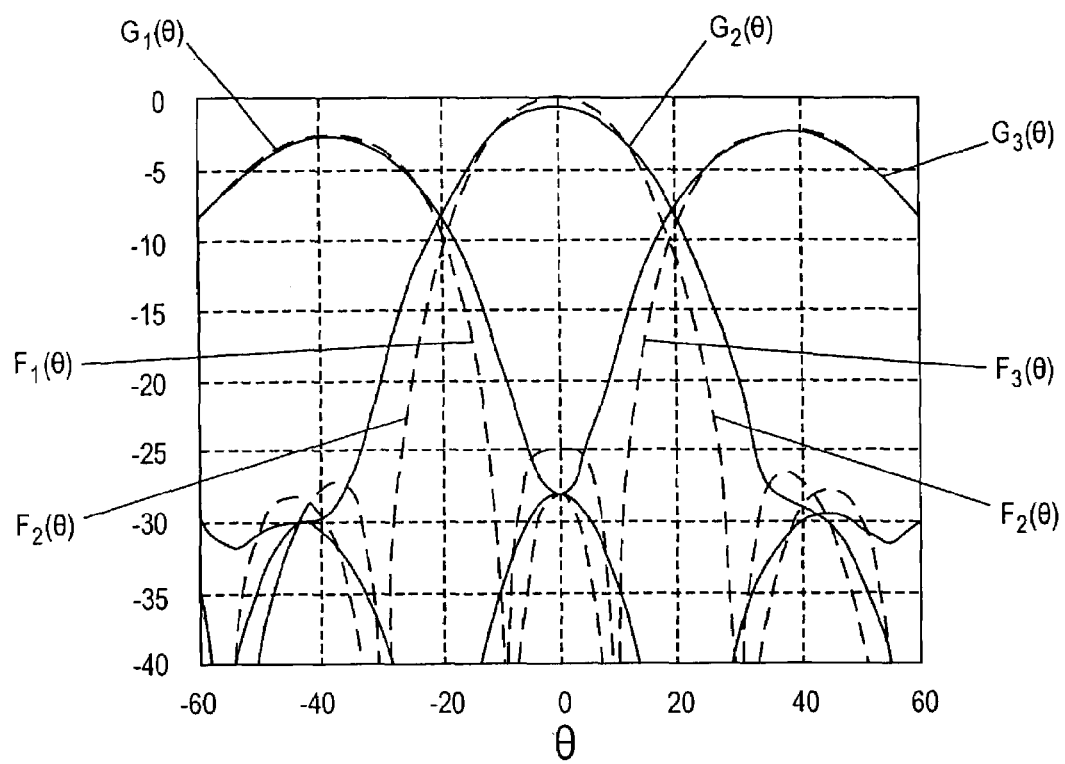
FIG. 3 shows in dotted lines the power beam patterns of the three antenna beams of the base station for the sector shown in FIG. 1 and in full lines the spread beam patterns after convolution with a probability distribution function of the scatterers using a Gaussian scattering model.

The unspread beam pattern (ie. power gain as a function of angle) of each beam of the multi-beam antenna array of the base station (2) is shown by dotted lines in FIG. 3 and can be represented by a function $F(\theta)$. The function $F(\theta)$ can be derived by antenna analysis modelling or by measurement of the antenna beams.

Referring to FIG. 1, the signal received by the base station (2) from the user equipment (6) is a sum of the signals reflected from scatterers (4), such as buildings, situated randomly around the mobile. The angles of arrival (AoAs) of the signals from the scatterers (4) at the base station (2) are various and so the set of scatterers (4) can be considered as a spread source. The probability distribution function of the environment can be modelled as a Gaussian two-dimensional distribution of scatterers in the plane (using polar coordinates r, $\phi$) in the form:

$$p(r, \varphi) = \frac{\alpha}{\pi}\exp(-\alpha r^2)$$

Therefore, a Probability Density Function (PDF) of AoAs of the scattered signals from the user equipment (6) as received by the base station (2) can be obtained as a PDF $p(\theta)$ of the angle distribution of the scatterers (4). If the user equipment (6) has an azimuth $\theta=0$, then $p(\theta)d\theta$ is the probability of a scatterer being located in the strip $d\theta$ in the direction $\theta$. PDF $p(\theta)$, is a one-dimensional distribution of scatterer probability versus the AoA, $\theta$, and is represented by the function:

$$p(\theta) = \frac{1}{\sqrt{\pi}} \frac{1}{\cos^2\theta} \frac{1}{\tan\theta_{eff}} \exp\left(-\frac{\tan^2\theta}{\tan^2\theta_{eff}}\right)$$

This function meets the normalisation requirement that:

$$\int_{-\infty}^{\infty} p(\theta)d\theta = 1$$

The angle spread of signals received by the base station (2) can be defined as $\Delta=2\theta_{eff}$, where $2\theta_{eff}$ is the width of the PDF $p(\theta)$ at the level equal to 1/e (−4.15 dB). The assumption is made that the mean power signal received from all scatterers is equal, and so the PDF $p(\theta)$ can be considered to be a Power Angle Spread (PAS) function.

Then considering the case when $\theta_{eff} \ll 1$ the function $p(\theta)$ can be simplified to the following expression for ensemble mean power as a function of angle:

$$p(\theta) \approx \frac{1}{\theta_{eff}\sqrt{\pi}} \exp\left[-\left(\frac{\theta}{\theta_{eff}}\right)^2\right]$$

The spread beam pattern for each beam (ie. $G(\theta)$, power gain as a function of angle), shown in full lines in FIG. 3, is given by the convolution (denoted ) of the unspread beam pattern $F(\theta)$ for that beam with the PAS function $p(\theta)$, as follows:

$$G(\theta) = F(\theta)p(\theta)$$

where the convolution is defined as follows.

If $a(\theta)$ and $b(\theta)$ are to be convolved to give $c(\theta) = a(\theta)b(\theta)$, then:

$$c(\theta) = a(\theta) \otimes b(\theta) = \int_{\tau=-\infty}^{\tau=+\infty} a(\tau)b(\theta-\tau)\,d\tau = \int_{\tau=-\infty}^{\tau=+\infty} b(\tau)a(\theta-\tau)\,d\tau$$

If the expressions for $a(\theta)$ and $b(\theta)$ are complicated, or not known in closed form, then this expression can be computed numerically, using a mathematical computing package such as Mathcad. The function can be approximated with only small error by choosing finite limits, as long as the limits are chosen to be sufficiently large that the approximation error is small (this can be verified by trial and error). For simplicity any wrap around effects at 180° have been ignored, which strictly speaking require a circular convolution function to be carried out rather than the above linear convolution. The wrap around effects are ignored because the angular range of interest (over which the bearing curves are generated, as described below) is much smaller than the angle at which the wrap around occurs.

An alternative approach is not to use the PAS function in the convolution integral as above, but to use a Monte Carlo simulation approach. In this Monte Carlo approach a set of realisations of spread beam patterns are generated for different realisations of scatterer model. Each of these spread beam patterns is generated by convolving the scatterer realisation (instead of the ensemble PAS) with the true beam pattern, analogously to the way described above. For each of these realisations of the scatterer model time averaging over the temporal fading is carried out. Finally, the many spread beam functions (one per realisation) are averaged. Provided a sufficient amount of averaging over many realisations, with sufficient temporal averaging for each realisation, then the result is equivalent to that derived using the convolution integral above.

The function $F(\theta)$ for each beam is convolved with $p(\theta)$ for a pre-determined angle spread $2\theta_{eff}$ to generate, as shown in FIG. 3, a spread beam pattern $G_1(\theta)$ for a first of the three beams having a power beam pattern shown in dotted lines by $F_1(\theta)$, $G_2(\theta)$ for a second of the three beams having a power beam pattern shown in dotted lines by $F_2(\theta)$ and $G_3(\theta)$ for a third of the three beams having a power beam pattern shown in dotted lines by $F_3(\theta)$. The angle spread used in FIG. 3 is 19.8°. The selection of the spread angle $2\theta_{eff}$ can be determined as explained below in relation to Table 1.

From the calculated spread beam patterns bearing curves $b_{21}(\theta)$ and $b_{23}(\theta)$ are calculated according to formulas:

$$b_{21}(\theta) = \frac{\sqrt{G_2(\theta)} - \sqrt{G_1(\theta)}}{\sqrt{G_1(\theta)} + \sqrt{G_2(\theta)}}$$

$$b_{23}(\theta) = \frac{\sqrt{G_2(\theta)} - \sqrt{G_3(\theta)}}{\sqrt{G_3(\theta)} + \sqrt{G_2(\theta)}}$$

Figure 5:
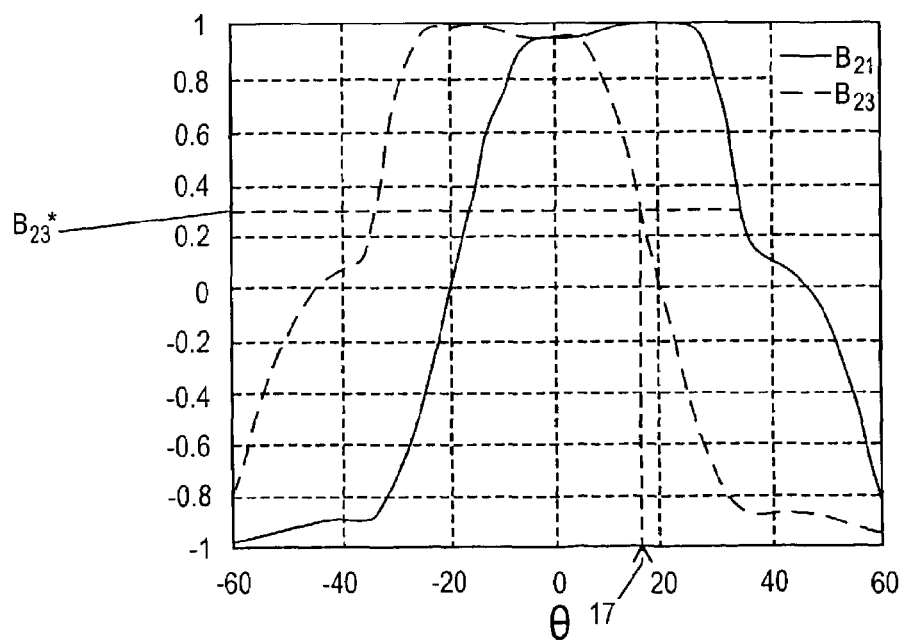
FIG. 5 shows the bearing curves $b_{21}(\theta)$ and $b_{23}(\theta)$ generated from the spread beams of FIG. 3.

The bearing curves $b_{21}(\theta)$ and $b_{23}(\theta)$ are shown in FIG. 5. It should be noted that the bearing curves are generated without regard to Additive White Gaussian Noise (AWGN), i.e. they are valid for very high SNR. Therefore, when the AoA is estimated the measured power signals from the end user equipment have a known noise power subtracted from them to get an unbiased signal power estimate, as is described in more detail below.

A data store (20) of values of $b_{21}(\theta)$ and the associated value of $\theta$ in the region of $-40°$ to $0°$ is then generated. The region $-40°$ to $0°$ is selected as this is the region covered by beams 1 and 2 and the associated value of $\theta$ is the estimated AoA for the value of $b_{21}(\theta)$. Similarly, values of $b_{23}(\theta)$ and the associated value of $\theta$ in the region of $40°$ to $0°$ are generated and added to the data store. The region $40°$ to $0°$ is selected as this is the region covered by beams 2 and 3 and the associated value of $\theta$ is the estimated AoA for the value of $b_{23}(\theta)$.

TABLE 1

Angle spread source parameters for various time windows

| Size of the time window (ns) | Mean number of scatterers in window | Observed angle spread $\Delta = 2(\delta\theta)$ (degrees) | Corrected angle spread $\Delta = 2(\theta_{eff})$ (degrees) |
|---|---|---|---|
| 260 | 4 | 22 | 19.8 |
| 780 | 9 | 30 | 28.4 |
| 1300 | 15 | 34 | 32.6 |
| 2600 | 20 | 37 | 35.7 |

Table 1 shows measured angle spreads in a dense urban scattering environment (central London), where the right hand column contains a correction term to account for the 8° 3 dB beamwidth of the antenna with which the data was measured. The (corrected) measured angle spread depends on the size of the time window within which we include arriving scattered signals. For a wide bandwidth transmitted signal, then using a signal processing technique known variously in the art as a Matched Filter or Correlator, signals can be gathered within a given time window of the first arrival, and later arriving signals can be excluded. The wider the bandwidth of the signal, the smaller the size of this time window can be made. The minimum size of this time window can be considered to be approximately equal to the reciprocal of the symbol rate of the transmitted signal (or chipping rate, if a CDMA system is used). For example, for the $3^{rd}$ Generation UMTS system (based upon CDMA), the shipping rate is 3.84 Mcps. The minimum time window over which signal components can be 'resolved' or 'excluded' is therefore approximately equal to the reciprocal of this, or 260 ns. For a narrow signal bandwidth, then the time window becomes correspondingly larger. For example, for the GSM system the symbol rate is 200 ksps, which leads to a time window of 5 μs (5000 ns).

Based on analysis of the measured Central London data, which was measured with a high signal bandwidth, it has been possible to quantify the effective angle spreads which would be seen using a correlator (matched to the first arrivals). This has been done for various different bandwidth signals, with time windows over the range of 260 ns to 2600 ns. So for a time window of 260 ns, it can be seen from Table 1 that the mean number of scatterers captured within the time window is 4, and the corrected angle spread (accounting for the beamwidth of the measurement antenna) is 19.8°. This value of angle spread of 19.8° is the one which was used to generate the spread beam patterns of FIG. 3. For a wider time window of 2600 ns, it can be seen from Table 1 that corrected angle spread (accounting for the measurement antenna) would now be 35.7°. The angle spread is higher because a larger number of scattered components are included, some of which will have path lengths significantly greater than the direct path. This is because these long-delay signals have scattered off an object (e.g. a building) with a large angular offset compared to the true mobile line of bearing. It would be expected that this higher angle spread (35.7° rather than 19.8°) would automatically mean that the angle estimation error for such a system with a wider time window (corresponding to a narrower signal bandwidth) would be higher. However, this is not necessarily the case, because with this larger time window the mean number of scatterers captured within the time window has also increased from 4 to 20. Thus whilst the angular displacement of each scattering centre is on average higher, there are many more of them. Thus the 'wandering' of the overall distribution about the true bearing angle is correspondingly reduced, since it is the result of averaging over many more randomly-displaced sources.

Finally, it is noted that given a higher bandwidth signal the effective size of the time window can be controlled. Although it is not easy to reduce the effective size of the time window, it can easily be increased by using, within a receiver, signal processing means consisting of multiple Matched Filters, each matched to a significant delayed path. Then the powers at the outputs of these matched filters can be summed and the summed power used as an estimate of signal power on any given beam. This is analogous to the concept of 'rake filtering' or 'rake combining' in a CDMA system, which is well known to those skilled in the art.

The process by which AoA is estimated is one of simultaneously measuring received power signals at the multiple outputs of the fixed beams of the antenna (after applying correlation or matched filtering and possibly rake combining, as described above). The power from each beam is measured over an observation interval, for example 400 ms by averaging over a large number of samples of signal power, for example at a 1 ms spacing (see steps $A_1$, $A_2$ and $A_3$ of FIG. 2). If the spread angle of $\Delta=2(\theta_{eff})$ of 19.8° is to be used in the calculation of the PAS, then the samples are outputs of a matched filter, matched to the first arrival of the received signal, in a 260 ns time window, in accordance with FIG. 1. Alternatively, the sums of the power outputs of multiple matched filters, each matched to a separate significant arrival of a dispersive multipath signal, can be used to sum signals received within a longer time window with $\Delta=2(\theta_{eff})$ selected accordingly.

Table 1 shows results for a dense urban environment. For a sub-urban environment the spread angle corresponding to a 260 ns time window might be around half of that in a dense urban environment, for example, in the region of 8° to 12°. For a rural area the spread angle corresponding to a 260 ns time window might be around half of that in a sub-urban environment, for example, in the region of 3° to 70°.

Figure 4:
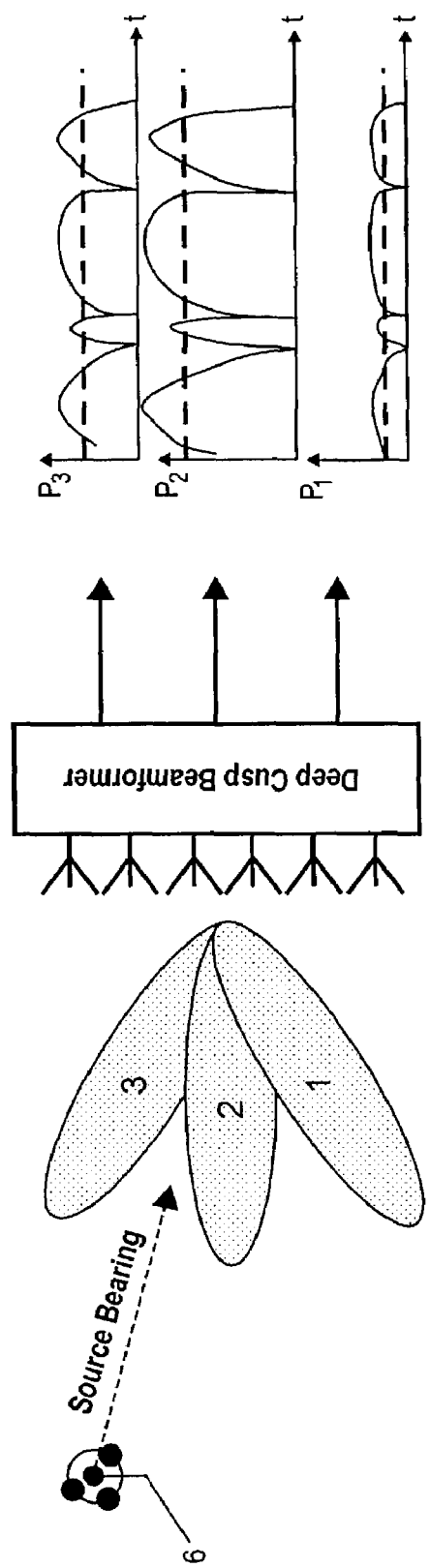
FIG. 4 shows schematically the generation of the measured power signals at the outputs of the three antenna beams of FIG. 1.

FIG. 4 shows the incoming signal from end user (6) in the cell sector covered by the three beams labelled 1, 2, and 3. The received signal powers measured from the three beams over the 400 ms observation interval are shown schematically by $p_1$, $p_2$ and $p_3$. The power of the signals periodically fade with a maximum Doppler frequency of 50 Hz (and hence a period of 20 ms). The observation interval, set at 400 ms is approximately 50 times longer than the time it takes the user equipment to move one wavelength in space, which itself is typically longer than the amount of mobile movement which is required to guarantee independent fading samples from start to finish. Thus, the averaging over the 400 ms interval adequately accounts for the effects of Doppler fading since it is chosen to be sufficiently long such that it encompasses a large number of independent signal fades. In this way, the measured power over the observation interval should provide a good estimate of the long term mean signal power. The averages of the measured powers for the three beams are shown by the dotted lines in the three graphs of FIG. 3.

A mean value for the AWGN is subtracted from the averaged measured received powers calculated for the three beams (see steps $B_1$, $B_2$ and $B_3$ of FIG. 2) to obtain unbiased estimates of the average signal powers at the three beam outputs. The expected noise contribution (which would consist of thermal noise plus residual interference) could be determined, for example, by measuring the power of the received signal samples over some sufficiently long period when the wanted signal is known to be absent If the result of the subtraction is a negative value, then the value is made positive (see steps $C_1$, $C_2$ and $C_3$ of FIG. 2). Then the noise adjusted average signal power of the outer beams (beams 1 and 3 in FIG. 3) are compared and the beam with the lowest average signal power is discarded (see step D of FIG. 2). In the example shown in FIG. 4, the beam 1 is the one which is discarded. The adjusted average signal power of the central beam $p_2^*$ and the adjusted average signal power of the remaining outer beam, ie. beam 3, $p_3^*$ are applied to a sum and difference equation equivalent to that used to calculate $b_{23}$ (see step $E_1$ of FIG. 2), as follows:

$$B_{23}^* = \frac{\sqrt{p_2^*} - \sqrt{p_3^*}}{\sqrt{p_3^*} + \sqrt{p_2^*}} = \frac{A_2 - A_3}{A_3 + A_2} \quad (1a)$$

where $A_3$ is the amplitude of the signal at beam 3 and $A_2$ is the amplitude of the signal at beam 2.

The resulting value of actual ratio $B_{23}$ is applied to the graph of the bearing curve $b_{23}$ of FIG. 5 in the region of 0° to 40° to generate an estimated angle of arrival of 17°. This is equivalent to looking up the value of $B_{23}^*$ in the data store (20) and extracting the associated AoA estimate.

If the adjusted average signal power $p_1^*$ is greater than the adjusted average signal power $p_3^*$, then the beam 3 is discarded and the adjusted average signal power of the central beam $p_2^*$ and the adjusted average signal power of the remaining outer beam, ie. beam 1, $p_1^*$ are applied to a sum and difference equation equivalent to that use to calculate $b_{21}$ (see step $E_2$ of FIG. 3), as follows:

$$B_{21}^* = \frac{\sqrt{p_2^*} - \sqrt{p_1^*}}{\sqrt{p_1^*} + \sqrt{p_2^*}} = \frac{A_2 - A_1}{A_1 + A_2} \quad (1b)$$

where $A_1$ is the amplitude of the signal at beam 1 and $A_2$ is the amplitude of the signal at beam 2.

The average amplitude of each beam is calculated as a square root of the adjusted average signal power of the beam and so the equations (1a) and (1b) represent a ratio of the difference of the amplitudes of the two selected beams (numerator) to the sum of the amplitudes (denominator).

The bearing curves shown in FIG. 5 can be converted into a data store or look up table (20) of bearing curve amplitude $b_{21}$ for the adjacent beams 1 and 2 and corresponding angle θ (in range 0° to −40°) and of bearing curve amplitude $b_{23}$ for the adjacent beams 2 and 3 and corresponding angle θ (in range 0° to 40°). In this case the adjusted average signal powers of the two selected beams (1 and 2 or 2 and 3) are applied to the appropriate difference/sum function (1a) or (1b) above to generate the calculated ratio $B_{21}^*$ or $B_{23}^*$. The thus calculated ratio $B_{21}^*$ or $B_{23}^*$ is then applied to the look up table bearing curve amplitude $b_{21}$ or $b_{23}$ respectively and the corresponding value of θ is extracted (see step F of FIG. 2).

Figure 6:
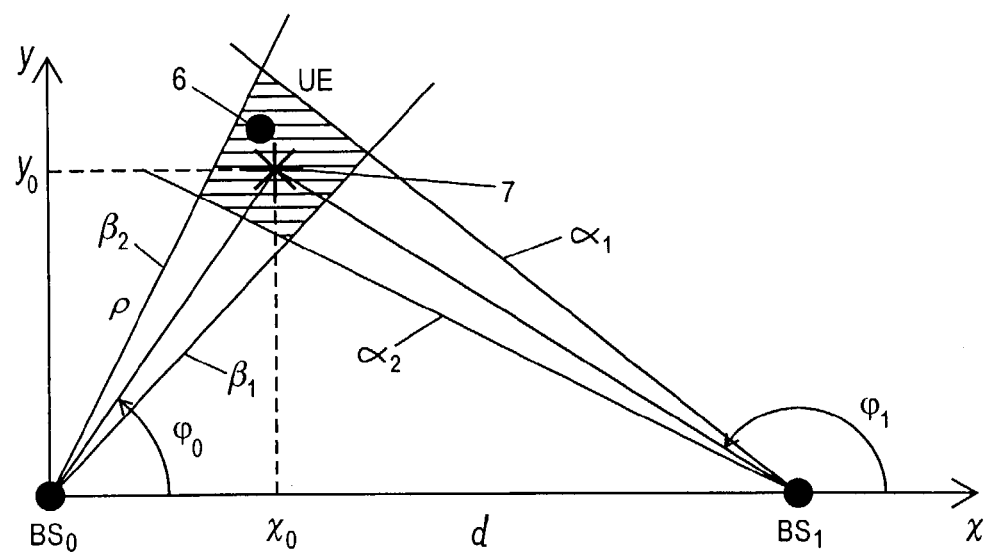
FIGS. 6 and 7 show schematically the position location of a user equipment (6) using triangulation of the AoA estimates from two base stations.

The results of the AoA estimate at the base station can be passed to a network controller for further processing to estimate the location of the user equipment (6), for example by triangulation based on estimates passed to the network controller by multiple base stations. Referring now to FIG. 6 which shows a first base station $BS_0$ and a second base station $BS_1$ separated by a distance d along a Cartesian axis x. A user equipment (6) is served, for example, by the first base station $BS_0$ and the second base station $BS_1$ is selected as a support base station, for example, on the criterion that of all the base stations adjacent to $BS_0$ it receives the strongest signal from user equipment (6). The first base station $BS_0$ receives a signal from the user equipment (6) and estimates its AoA to be $\phi_0$ with respect to the x-axis. The second base station $BS_1$ also receives a signal from the user equipment (6) and estimates its AoA to be $\phi_1$ with respect to the x-axis. Then by locating the intersection of a line extending from base station $BS_0$ at an angle $\phi_0$ with a line extending from base station $BS_1$ at an angle $\phi_1$ a position location $(x_0, y_0)$ can be obtained in Cartesian coordinates for the user equipment (6)

Figure 2:
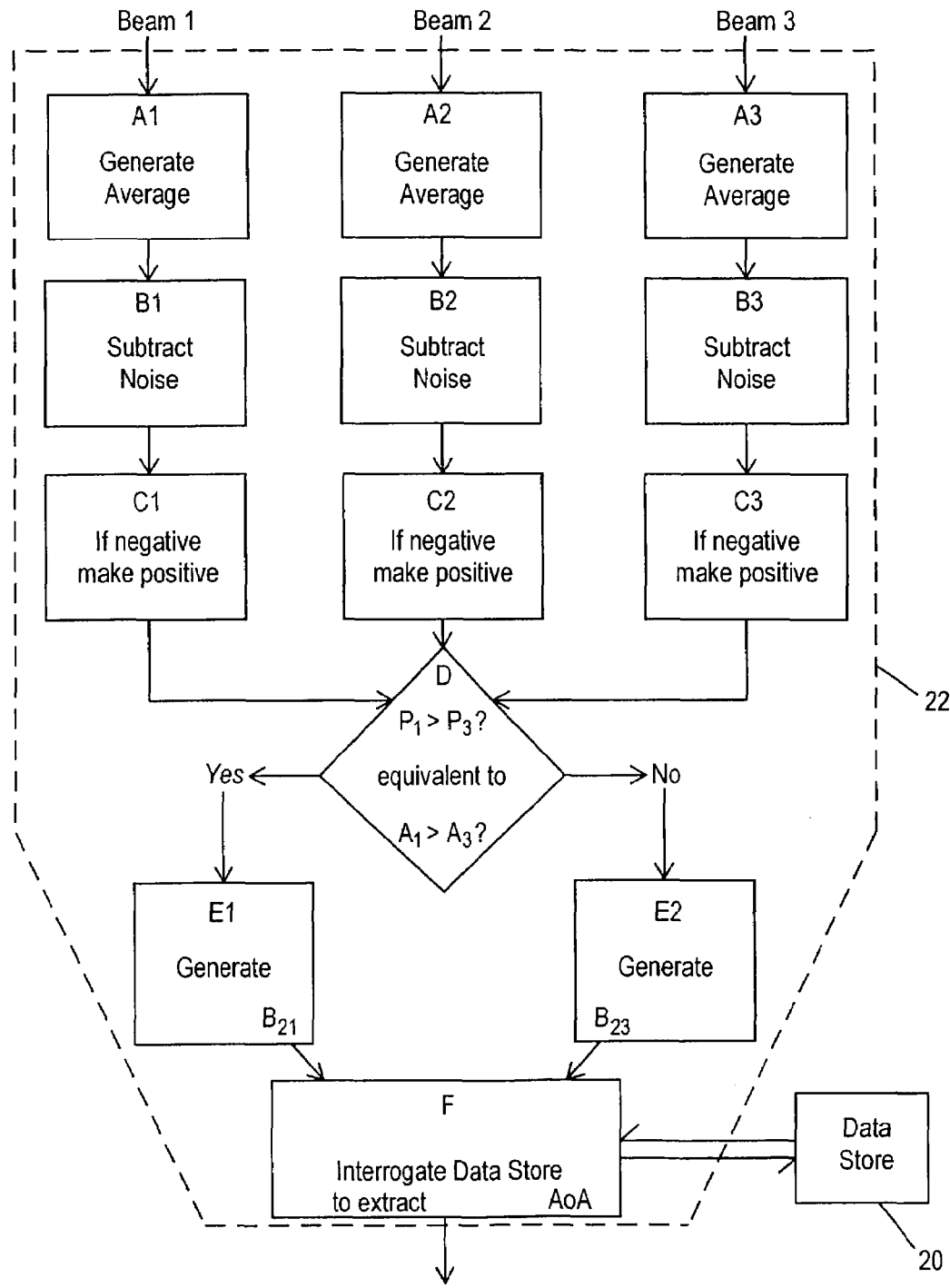
FIG. 2 shows schematically the process steps involved in estimating an AoA according to the present invention.

All or some of the process or method steps shown inside the dotted line box (22) of FIG. 2 can be executed by a signal processor (22) located at a base station (2). The early steps in the process shown in FIG. 2 could be carried out by a signal processor located at a base station (2) and the later steps, for example step F onwards, could be carried out by a signal processor at a base station controller (24) for controlling a plurality of base stations.

Computer readable material may be installed at the base station (2) for executing all or some of the steps shown in FIG. 2. The early steps in the process shown in FIG. 2 could be carried out by computer readable material or software installed at a base station (2) and the later steps, for example step F onwards, could be carried out at by computer readable material or software installed at a base station controller (24) for controlling a plurality of base stations.

A base station (2) or a base station controller, or a combination of the two may make up a sub-system of the wireless telecommunications network.

As an alternative to the difference/sum ratio of the spread beam patterns for calculating the bearing curves set out above, the bearing curves can be calculated as a simple ratio of the spread beam patterns as follows:

$$b_{21}(\theta) = \frac{\sqrt{G_1(\theta)}}{\sqrt{G_2(\theta)}}$$

$$b_{23}(\theta) = \frac{\sqrt{G_3(\theta)}}{\sqrt{G_2(\theta)}}$$

in which case equations (1a) and (1b) above will be altered to be as follows:

$$B_{23}^* = \frac{\sqrt{p_3^*}}{\sqrt{p_2^*}} = \frac{A_3}{A_2} \quad (1a)$$

and $$B_{21}^* = \frac{\sqrt{p_1^*}}{\sqrt{p_2^*}} = \frac{A_1}{A_2} \quad (1b)$$

Figure 7:
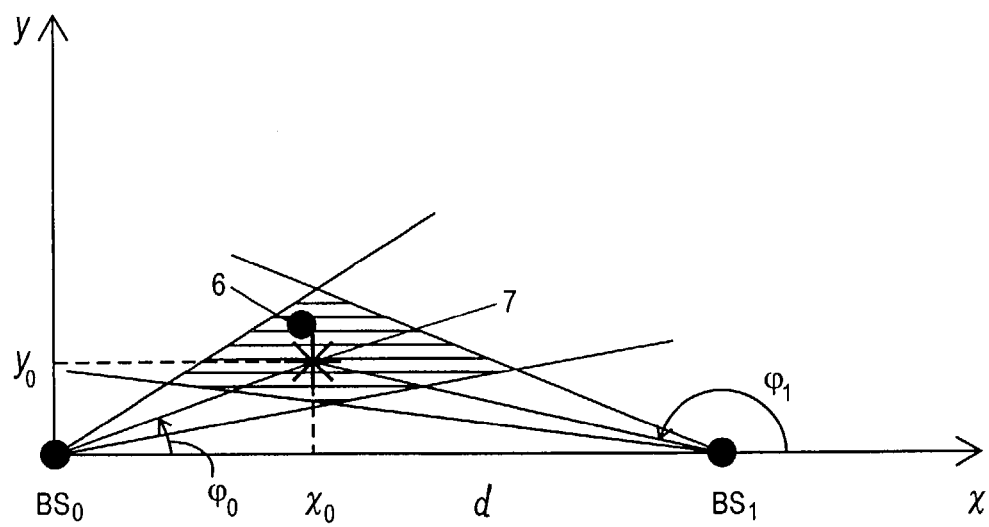

The AoA estimate is subject to errors and so the position location for the user equipment (6) is similarly subject to errors. In FIG. 6 $\phi_1$ is the estimated AoA generated by the base station $BS_1$ with respect to the x-axis and so the base station $BS_1$ estimates the user equipment (6) to be located on this line. The lines $\alpha_1$ and $\alpha_2$ to either side of the line at angle $\phi_1$ extending from base station $BS_1$ define an area where there is a high probability that the user equipment (6) is located, based on the results from base station $BS_1$ only. Similarly, $\phi_0$ is the estimated AoA generated by the base station $BS_0$ with respect to the x-axis and so the base station $BS_0$ estimates the user equipment (6) to be located on this line. The lines $\beta_1$ and $\beta_2$ to either side of the line at angle $\phi_0$ extending from base station $BS_0$ define an area where there is a high probability that the user equipment is located in the area, based on the results from base station $BS_0$ only. Thus, the combined results from base stations $BS_0$ and $BS_1$ give an estimate of the user equipment location to be at the location (7), where the lines $\phi_0$ and $\phi_1$ cross. The cross-hatched area in FIG. 6, enclosed by the lines $\alpha_1$, $\alpha_2$, $\beta_1$ and $\beta_2$ defines an area where there is a high probability that the user equipment (6) is located, based on the triangulation of the results of the base stations $BS_0$ and $BS_1$. In FIG. 6, the true position of the user equipment (6) is within this cross hatched area, but does not coincide with the estimated position (7). It should be noted that the shape of the cross-hatched area of FIG. 6 will change for different values of $\phi_0$ and $\phi_1$. In particular, as shown in FIG. 7 where the user equipment (6) is located close to the x-axis, the cross-hatched area will become elongated in the direction of the x-axis thus reducing the accuracy of the position location of the user equipment in the direction of the x-axis, although the accuracy of the position location of the user equipment may be improved in the direction of the y-axis.

The invention claimed is:

1. A method of estimating the Angle of Arrival (AoA) of a signal from a user equipment received at a base station of a wireless telecommunications network in which the base station has a multi-beam antenna, comprising the steps of:

deriving the amplitude of the signal for each beam of the antenna;

selecting the two adjacent beams which have the highest amplitude;

calculating a ratio of functions of the amplitudes of the two selected beams;

determining the estimated AoA of the signal from the calculated ratio by inputting the calculated ratio for the two selected beams into a ratio data store, which data store stores a set of ratios for each pair of adjacent beams and stores an estimated AoA corresponding to each such ratio, to generate the estimated AoA associated with the calculated ratio for the two selected beams and wherein the ratios stored in the data store account for the spreading effect of signals received by the base station from a user equipment in the cell due to reflections from scatterers.

2. A method according to claim 1 wherein the ratio of functions of the amplitudes is a simple ratio of the amplitudes of the two selected beams.

3. A method according to claim 1 wherein the ratio of functions of the amplitudes is a ratio of difference between the amplitudes of the two selected beams to the sum of the amplitudes.

4. A method according to claim 1 wherein the ratio $B_{xy}$ is calculated according to the following equation:

$$B_{xy} = \frac{A_x - A_y}{A_y + A_x}$$

where $A_x$ is the amplitude of the signal for a first selected beam and $A_y$ is the amplitude of the signal for a second selected beam.

5. A method according to claim 1 wherein the amplitude of the signal for each beam of the antenna is derived as a square root of the measured power p of that beam.

6. A method according to claim 1 wherein the amplitude of the signal for each beam of the antenna is derived as a square root of the measured power p of that beam and the measured power from each beam of the antenna is measured over a predetermined observation interval by averaging over a large number of samples.

7. A method according to claim 1 wherein the amplitude of the signal for each beam of the antenna is derived as a square root of the measured power p of that beam, comprising the additional step of subtracting an expected noise contribution from the measured power of each beam before the selecting of the two adjacent beams.

8. A method according to claim 1 wherein the base station covers a cell of the network and the cell is split into sectors and a multi-beam antenna is deployed in each sector of the cell.

9. A method according to claim 1 in which the base station has a three-beam antenna array, the three beam antenna array having a central beam and two side beams, comprising the steps of:

deriving the amplitude of the signal for each of the three beams of the antenna;

selecting the central beam and the one of the side beams having the highest amplitude;

calculating a ratio of functions of the amplitudes of the two selected beams; and determining the estimated AoA of the signal from the calculated ratio.

10. A method of estimating the Angle of Arrival (AoA) of a signal from a user equipment received at a base station of a wireless telecommunications network in which the base station has a multi-beam antenna, comprising the steps of:

deriving the amplitude of the signal for each beam of the antenna;

selecting the two adjacent beams which have the highest amplitude;

calculating a ratio of functions of the amplitudes of the two selected beams;

determining the estimated AoA of the signal from the calculated ratio and wherein the amplitude of the signal for each beam of the antenna is derived as a square root of the measured power p of that beam comprising the additional steps of assessing the measured power and if the measured power is a negative value, converting it to a positive value.

11. A method of estimating the Angle of Arrival (AoA) of a signal from a user equipment received at a base station of a wireless telecommunications network in which the base station has a multi-beam antenna, comprising the steps of:

deriving the amplitude of the signal for each beam of the antenna;

selecting the two adjacent beams which have the highest amplitude;

calculating a ratio of functions of the amplitudes of the two selected beams;

determining the estimated AoA of the signal from the calculated ratio and wherein the amplitude of the signal for each beam of the antenna is derived as a square root of the measured power p of that beam comprising the additional steps of subtracting an expected noise contribution from the measured power of each beam and then assessing the measured power and if the measured power is a negative value, converting it to a positive value before the selecting of the two adjacent beams.

12. A method of estimating the Angle of Arrival (AoA) of a signal from a user equipment received at a base station of a wireless telecommunications network in which the base station has a multi-beam antenna, comprising the steps of:

deriving the amplitude of the signal for each beam of the antenna;

selecting the two adjacent beams which have the highest amplitude;

calculating a ratio of functions of the amplitudes of the two selected beams;

determining the estimated AoA of the signal from the calculated ratio and wherein the step of determining the estimated AoA of the signal from the calculated ratio comprises the step of inputting the calculated ratio for the two selected beams into a ratio data store which data store stores a set of ratios for each pair of adjacent beams and stores an estimated AoA corresponding to each such ratio and the set of stored ratios $b_{x,y}$ for each adjacent beam pair (x, y), represents a function $b_{x,y}(\theta)$ of the azimuth angle $\theta$ of the antenna according to the following equation:

$$b_{x,y}(\theta) = \frac{\sqrt{G_x(\theta)} - \sqrt{Gy(\theta)}}{\sqrt{Gy(\theta)} + \sqrt{G_x(\theta)}}$$

where each function $G_x(\theta)$, $G_y(\theta)$ represents a mathematical convolution of a first function representing the respective beam (x, y) of the antenna as a function of the azimuth angle ($\theta$) of the beam and a second function representing the spread of signals received by the base station from a user equipment in the cell due to reflections from scatterers as a function of azimuth angle (θ).

13. A sub-system of a wireless telecommunications network for estimating the Angle of Arrival (AoA) of a signal from a user equipment received at a base station of the network, which base station has a multi-beam antenna, which sub-system comprises a signal processor for generating a signal representing the amplitude of the signal received from the user equipment for each beam of the antenna, selecting the two adjacent beams which have the highest amplitude, calculating a ratio of functions of the amplitudes of the two selected beams and determining the estimated AoA of the signal from the calculated ratio and the sub-system additionally comprises a ratio data store which stores a set of ratios for each pair of adjacent beams and stores an estimated AoA corresponding to each such ratio and the signal processor additionally includes an interface with the data store for inputting the calculated ratio for the two selected beams into the data store to generate the estimated AoA associated with the calculated ratio for the two selected beams
and wherein the ratios stored in the data store account for the spreading effect of signals received by the base station from a user equipment in the cell due to reflections from scatterers.

14. A method according to claim 13 wherein the ratio of functions of the amplitudes is a simple ratio of the amplitudes of the two selected beams.

15. A method according to claim 13 wherein the ratio of functions of the amplitudes is a ratio of difference between the amplitudes of the two selected beams to the sum of the amplitudes.

16. A sub-system according to claim 13 wherein the signal processor calculates the ratio $B_{xy}$ according to the following equation:

$$B_{xy} = \frac{A_x - A_y}{A_y + A_x}$$

where $A_x$ is the amplitude of the signal for a first selected beam and $A_y$ is the amplitude of the signal for a second selected beam.

17. A sub-system according to claim 13 wherein the amplitude of the signal for each beam of the antenna is derived as a square root of the measured power p of that beam.

18. A sub-system according to claim 13 wherein the amplitude of the signal for each beam of the antenna is derived as a square root of the measured power p of that beam and the signal processor measures the power output from each beam of the antenna over a predetermined observation interval by averaging over a large number of samples to generate the measured power of the beam.

19. A sub-system according to claim 13 wherein the amplitude of the signal for each beam of the antenna is derived as a square root of the measured power p of that beam and the signal processor subtracts an expected noise contribution from the measured power of each beam before the selecting of the two adjacent beams.

20. A sub-system according to claim 13 of a network in which the base station covers a cell of the network and the cell is split into sectors and a multi-beam antenna is deployed in each sector of the cell.

21. A sub-system according to claim 13 of a network in which the base station has a three-beam antenna array, the three beam antenna array having a central beam and two side beams, which sub-system comprises:
  a signal processor for deriving a signal representing the amplitude of the signal received from the user equipment for the three beams of the antenna, selecting the central beam and the one of the side beams having the highest amplitude and calculating a ratio of functions of the amplitudes of the two selected beams;
  a ratio data store which data store stores a set of ratios for each of the two pairs of adjacent beams and stores an estimated AoAs corresponding to each such ratio; and
  the signal processor additionally including an interface with the data store for inputting the calculated ratio for the two selected beams into the data store to generate the estimated AoA associated with the calculated ratio for the two selected beams.

22. A sub-system of a wireless telecommunications network for estimating the Angle of Arrival (AoA) of a signal from a user equipment received at a base station of the network, which base station has a multi-beam antenna, which sub-system comprises a signal processor for generating a signal representing the amplitude of the signal received from the user equipment for each beam of the antenna, selecting the two adjacent beams which have the highest amplitude, calculating a ratio of functions of the amplitudes of the two selected beams and determining the estimated AoA of the signal from the calculated ratio and wherein the amplitude of the signal for each beam of the antenna is derived as a square root of the measured power p of that beam and the signal processor assesses the measured power and if the measured power is a negative value, converts the measured power to a positive value before the selecting of the two adjacent beams.

23. A sub-system of a wireless telecommunications network for estimating the Angle of Arrival (AoA) of a signal from a user equipment received at a base station of the network, which base station has a multi-beam antenna, which sub-system comprises a signal processor for generating a signal representing the amplitude of the signal received from the user equipment for each beam of the antenna, selecting the two adjacent beams which have the highest amplitude, calculating a ratio of functions of the amplitudes of the two selected beams and determining the estimated AoA of the signal from the calculated ratio and wherein the amplitude of the signal for each beam of the antenna is derived as a square root of the measured power p of that beam and the signal processor subtracts an expected noise contribution from the measured power of each beam and then assesses the measured power and if the measured power is a negative value converts the measured power to a positive value before the selecting of the two adjacent beams.

24. A sub-system of a wireless telecommunications network for estimating the Angle of Arrival (AoA) of a signal from a user equipment received at a base station of the network, which base station has a multi-beam antenna, which sub-system comprises a signal processor for generating a signal representing the amplitude of the signal received from the user equipment for each beam of the antenna, selecting the two adjacent beams which have the highest amplitude, calculating a ratio of functions of the amplitudes of the two selected beams and determining the estimated AoA of the signal from the calculated ratio and the sub-system additionally comprises a ratio data store which data store stores a set of ratios for each pair of adjacent beams and stores an estimated AoA corresponding to each such ratio and the set of stored ratios $b_{x,y}$ for each adjacent beam pair (x, y), represents a function $b_{x,y}(\theta)$ of the azimuth angle $\theta$ of the antenna according to the following equation:

$$b_{x,y}(\theta) = \frac{\sqrt{G_x(\theta)} - \sqrt{G_y(\theta)}}{\sqrt{G_y(\theta)} + \sqrt{G_x(\theta)}}$$

where each function $G_x(\theta)$, $G_y(\theta)$ represents a mathematical convolution of a first function representing the respective beam (x, y) of the antenna as a function of the azimuth angle ($\theta$) of the beam and a second function representing the spread of signals received by the base station from a user equipment in the cell due to reflections from scatterers as a function of azimuth angle ($\theta$).

25. Computer readable media suitable for installation in a sub-system of a wireless telecommunications network, for estimating the Angle of Arrival (AoA) of a signal from a user equipment received at a base station of the network, which base station has a multi-beam antenna, by executing the steps of:
  obtaining the amplitude of the signal for each beam of the antenna;
  selecting the two adjacent beams which have the highest amplitude;
  calculating a ratio of functions of the amplitudes of the two selected beams;
  determining the estimated AoA of the signal from the calculated ratio by inputting the calculated ratio for the two selected beams into a ratio data store, which data store stores a set of ratios for each pair of adjacent beams and stores an estimated AoA corresponding to each such ratio, to generate the estimated AoA associated with the calculated ratio for the two selected beams and wherein the ratios stored in the data store account for the spreading effect of signals received by the base station from a user equipment in the cell due to reflections from scatterers.

26. Computer readable media according to claim 25 wherein the ratio of functions of the amplitudes is a simple ratio of the amplitudes of the two selected beams.

27. Computer readable media according to claim 25 wherein the ratio of functions of the amplitudes is a ratio of difference between the amplitudes of the two selected beams to the sum of the amplitudes.

28. Computer readable media according to claim 25 wherein the ratio $B_{xy}$ is calculated according to the following equation:

$$B_{xy} = \frac{A_x - A_y}{A_y + A_x}$$

where $A_x$ is the amplitude of the signal for a first selected beam and $A_y$ is the amplitude of the signal for a second selected beam.

29. Computer readable media according to claim 25 wherein the amplitude of the signal for each beam of the antenna is derived as a square root of the measured power p of that beam.

30. Computer readable media according to claim 25 wherein the amplitude of the signal for each beam of the antenna is obtained as a square root of the measured power p of that beam and the measured power from each beam of the antenna is measured over a predetermined observation interval by averaging over a large number of samples.

31. Computer readable media to according claim 25 wherein the amplitude of the signal for each beam of the antenna is obtained as a square root of the measured power p of that beam, for executing the additional step of subtracting an expected noise contribution from the measured power of each beam before the selecting of the two adjacent beams.

32. Computer readable media according to claim 25 wherein the amplitude of the signal for each beam of the antenna is obtained as a square root of the measured power p of that beam, for executing the additional steps of assessing the measured power and if the measured power is a negative value, converting it to a positive value before the selecting of the two adjacent beams.

33. Computer readable media according to claim 25 wherein the base station covers a cell of the network and the cell is split into sectors and a multi-beam antenna is deployed in each sector of the cell.

34. Computer readable media according to claim 25 where the base station has a three-beam antenna array, the three beam antenna array having a central beam and two side beams, for executing the steps of:
  obtaining the amplitude of the signal for each of the three beams of the antenna;
  selecting the central beam and the one of the side beams having the highest amplitude;
  calculating a ratio of functions of the amplitudes of the two selected beams; and
  determining the estimated AoA of the signal from the calculated ratio.

35. Computer readable media suitable for installation in a sub-system of a wireless telecommunications network, for estimating the Angle of Arrival (AoA) of a signal from a user equipment received at a base station of the network, which base station has a multi-beam antenna, wherein the computer readable media includes a data store which stores a set of ratios for each pair of adjacent beams of the antenna and stores an estimated AoA corresponding to each such ratio, where each ratio represents the expected ratio of functions of the amplitudes of the pair of adjacent beams for a signal received by the antenna from a user equipment located with respect to the antenna at the corresponding estimated AoA and wherein the ratios stored in the data store account for the spreading effect of signals received by the base station from a user equipment in the cell due to reflections from scatterers.

36. Computer readable media suitable for installation in a sub-system of a wireless telecommunications network, for estimating the Angle of Arrival (AoA) of a signal from a user equipment received at a base station of the network, which base station has a multi-beam antenna, wherein the computer readable media includes a data store which stores a set of ratios for each pair of adjacent beams of the antenna and stores an estimated AoA corresponding to each such ratio, where each ratio represents the expected ratio of functions of the amplitudes of the pair of adjacent beams for a signal received by the antenna from a user equipment located with respect to the antenna at the corresponding estimated AoA and wherein the set of stored expected ratios $b_{x,y}$ for each adjacent beam pair (x, y), represents a function $b_{x,y}(\theta)$ of the azimuth angle θ of the antenna according to the following equation:

$$b_{x,y}(\theta) = \frac{\sqrt{G_x(\theta)} - \sqrt{G_y(\theta)}}{\sqrt{G_y(\theta)} + \sqrt{G_x(\theta)}}$$

where each function $G_x(\theta)$, $G_y(\theta)$ represents a mathematical convolution of a first function representing the respective beam (x, y) of the antenna as a function of the azimuth angle (θ) of the beam and a second function representing the spread of signals received by the base station from a user equipment in the cell due to reflections from scatterers as a function of azimuth angle (θ).

37. A method for generating a ratio data store, which data store is suitable for use in estimating the Angle of Arrival (AoA) of a signal from a user equipment received at a base station of a wireless telecommunications network in which the base station has a multi-beam antenna array, comprising the steps of:

a. generating a mathematical representation of a single beam of the multi-beam antenna as a function of the azimuth angle (θ) of the beam;

b. generating a mathematical representation of the spread of signals received by the base station from a user equipment in the cell due to reflections from scatterers as a function of azimuth angle (θ);

c. convolving the two mathematical representations to generate a spread angle function G(θ);

d. performing steps a. to c. for each beam of the multi-beam antenna to generate a set of spread angle functions $G_{1\ldots n}(\theta)$, where n is the number of beams;

e. for each pair of adjacent beams generating a ratio function $b_{x,x-1}(\theta)$ having the form:

$$b_{x,x-1}(\theta) = \frac{\sqrt{G_x(\theta)} - \sqrt{G_{x-1}(\theta)}}{\sqrt{G_{x-1}(\theta)} + \sqrt{G_x(\theta)}}; \text{ and}$$

f. generating the data store by storing values of the ratio $b_{x,x-1}(\theta)$ for each pair of adjacent beams and storing an estimated azimuth angle (θ) corresponding to each such value of ratio, which azimuth angle is the corresponding estimated AoA.

* * * * *